July 15, 1924.  
T. F. PHILIPPI  
CLUTCH  
Filed April 13, 1922
1,501,232
2 Sheets-Sheet 2
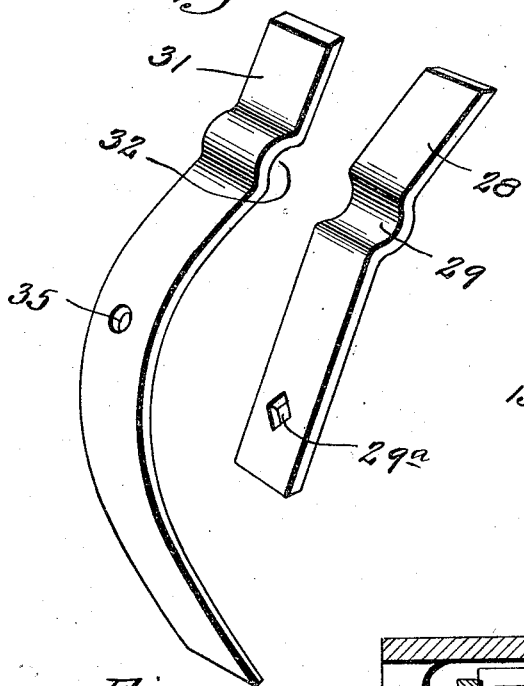
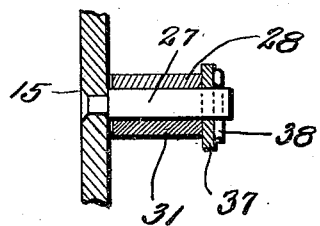
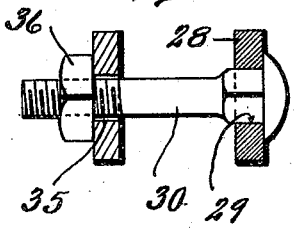
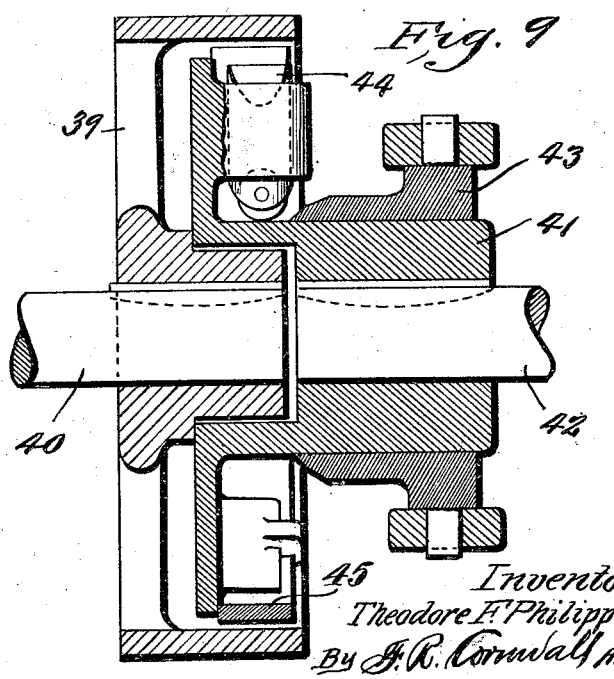
Inventor
Theodore F. Philippi
By J. R. Cornwall, Atty.

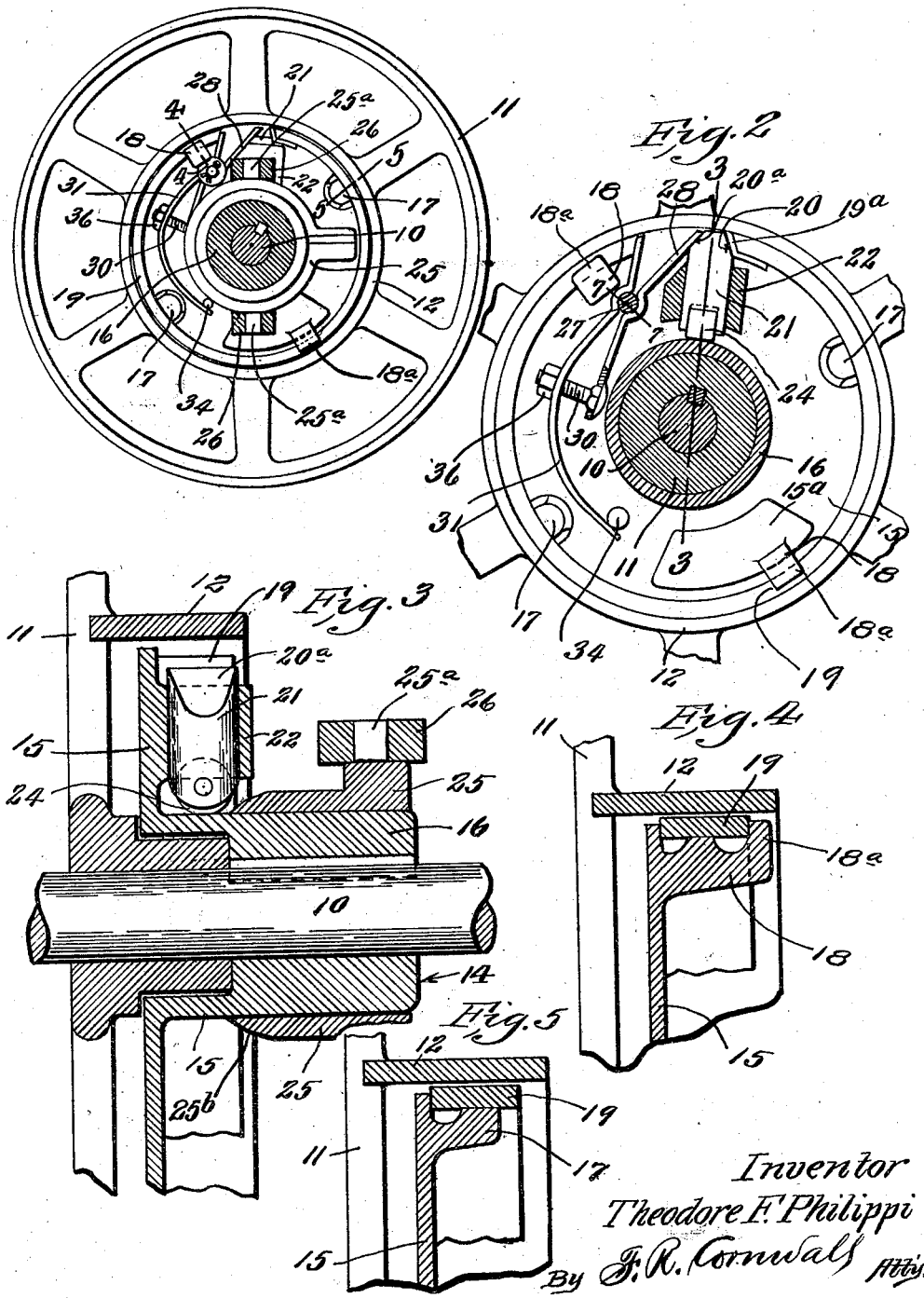

Patented July 15, 1924.

1,501,232

UNITED STATES PATENT OFFICE.

THEODORE F. PHILIPPI, OF EAST ST. LOUIS, ILLINOIS.

CLUTCH.

Application filed April 13, 1922. Serial No. 552,350.

*To all whom it may concern:*

Be it known that I, THEODORE F. PHILIPPI, a citizen of the United States, residing at the city of East St. Louis, county of St. Clair, and State of Illinois, have invented a certain new and useful Improvement in Clutches, of which the following is a full, clear, and exact description, such as will enable others skilled in the art to which it appertains to make and use the same, reference being had to the accompanying drawings, forming part of this application.

This invention relates to new and useful improvements in clutches, and the objects of the invention are to provide a clutch which is of simple construction, is highly efficient in operation, and contains few parts, thereby reducing the liability of the clutch getting out of order.

Further objects of my invention are to provide a clutch which is compact and has no projecting parts thus eliminating all the danger of having the operator's clothing caught in the clutch and injuring the operator.

Still further objects of my invention are to provide a clutch the co-operating members of which are adapted to be interengaged by means of an expansible friction member, the latter being operatively engaged by tension means which are designed to automatically take up any variation caused by the expansion of the clutch-operating parts due to heat, thus eliminating slipping after the clutch is warmed up and provide means for adjusting the clutch ring which is subjected to wear.

With these and other objects in view, my invention consists in certain novel features of construction and arrangements of parts hereinafter more fully described and claimed and illustrated in the accompanying drawings, in which:—

Figure 1 is a front elevation of the clutch as applied to a pulley.

Figure 2 is a detail elevational view on an enlarged scale of the clutch mechanism with parts thereof shown in section to more clearly illustrate the invention.

Figure 3 is a longitudinal cross-section taken on line 3—3 of Figure 2.

Figure 4 is a longitudinal cross-section taken on line 4—4 of Figure 1.

Figure 5 is a longitudinal cross-section taken on line 5—5 of Figure 1.

Figure 6 is a perspective detail view of the spring members.

Figure 7 is a detail sectional view taken on line 7—7 of Figure 2.

Figure 8 is a cross-sectional view through the lower portions of the spring members and showing means for adjusting the same.

Figure 9 is a sectional view of a modified form of the clutch.

Referring by numerals to the accompanying drawings, 10 designates a shaft on which is loosely mounted the driven member of the clutch, in the present instance in the form of a pulley 11. This pulley is provided with a circular flange or rim 12 which is arranged concentrically with the shaft 10 a suitable distance inwardly from the face of the pulley. A driving clutch member 14 is keyed to shaft 10 adjacent to the driven clutch member 11.

This driving clutch member comprises an outwardly projecting disk portion 15 and a hub 16. Projecting laterally from disk 15 is a pair of substantially diametrically opposed lugs or posts 17 and a pair of diametrically arranged lugs or posts 18, the latter having outwardly presented overhanging portions $18^a$. A split ring or band 19 is supported on lugs 17 and 18, and is held against lateral displacement by means of the projections $18^a$ which extend outwardly and engage the outer edge of said ring while the inner edge of said ring rests against disk 15. The ends of the ring are spaced apart a suitable distance and are beveled, and engaging one of these beveled ends is a tapered portion or cam face 20 formed on the outer end of a bar or member 21, which is slidably mounted in a bearing 22. This bearing is carried by disk 15 and is preferably formed integral with said disk and projects laterally from the outer face of said disk. The inner or lower end of bar 21 projects inwardly from the lower end of bearing 22 and is provided with an anti-friction roller 24.

Slidably arranged on the hub 16 of clutch member 14 is a sleeve 25 which is shiftable on said hub by means of arms 26 which engage projections or pins $25^a$ carried by said sleeve. The inner end of this sleeve is beveled, as indicated at $25^b$, and is designed, when said sleeve is shifted inwardly, to engage roller 24 and move bar 21 outwardly so that the tapered portion 20 of the outer end of said bar will be forced against the beveled end of ring 19, thereby causing the latter to expand and engage rim 12 of the driven clutch member 11.

Projecting laterally from disk 15 is a pin or lug 27 and pivotally arranged thereon is a spring member or lever 28 preferably made of a leaf spring and having a seat 29 pressed therein for engagement with pin 27. The upper end of this lever diverges outwardly from pin 27 and its extreme end bears against the tapered portion of cam face $20^a$ which is arranged on the upper end of bar 21 and oppositely disposed with respect to cam face 20. The lower or inner portion of lever 28 is provided with a non-circular aperture $29^a$ which is adapted to receive the non-circular shank portion of a bolt 30 and thus hold the latter against rotation.

Oppositely disposed with respect to lever 28 is a spring member or lever 31 having a seat 32 formed therein for engagement with pin 27. The upper or outer end of this lever rests against the other end of ring 19 and the lower or inner portion of lever 31 extends beyond the end of the lower portion of lever 28 and is curved away from lever 28 and the extreme end of this inner portion of lever 31, which is slightly tapered, rests against a lug or projection 34 formed on disk 15. The curved inner portion of lever or spring 31 is provided with an opening 35 through which the threaded end of bolt 30 passes and receives a nut 36. By turning nut 36, spring members 28 and 31 can be put under proper tension and the curved inner portion of lever 31 being supported at its ends by pin 27 and lug 34 is also placed under tension and locks nut 36 against accidental displacement. Levers 28 and 31 are held in position on pin 27 by means of a washer 37 which is placed on the end of said pin and held thereon by a cotter pin 38 arranged in an aperture in pin 27. That end of ring 19 which is engaged by cam portion 20 of bar 21 is preferably provided with a removable portion $19^a$ which can be renewed when worn out.

Disk 15 is provided with lug $15^a$ which serves as a counterbalance for bar 21 and bearing 22 and spring members 28 and 31.

In Figure 9, I have illustrated a modified form of my improved clutch in which one of the clutch members 39 is keyed to a shaft 40 while the other clutch member 41 is fixed to a shaft 42, said shafts being in axial alinement. When sleeve 43 is shifted into an operative position, bar 44 expands ring 45, causing the latter to interlock members 39 and 41 so that shaft 40 is coupled to shaft 42.

In operating the clutch, sleeve 25 is moved inwardly on hub 16 by means of arms 26 until the roller 24 rests on the horizontal portion of sleeve 25 whereby bar 21 is moved outwardly into an operative position. The tapered face 20 forces one end of ring 19 outwardly against the rim portion 12 and the tapered face $20^a$ engages the upper end of spring 28 and thereby forces the upper end of member 31, through its connections 30 and 36 against the opposite end of ring 19 causing the latter to move outwardly against rim 12. Thus, both ends of ring 19 are simultaneously acted upon, causing said ring to expand and engage rim 12.

The driving torque is preferably transmitted from disk portion 15 to the expansion ring 19 through the wedging bar 21 which is mounted in a bearing formed on said disk and rests against one end of said expansion ring and is also transmitted through spring member 31 which rests against the opposite end of said ring and is anchored at 27 to said disk portion.

When sleeve 25 is shifted to an inoperative position, bar 21 is restored to its inner or normal position under the influence of springs 28 and 31 and the pressure is removed from the ring 19 permitting the latter to move into its contracted position out of engagement with rim 12. By adjusting the nut 36 on bolt 30, the clutch ring can be properly adjusted and the extended curved inner portion of lever 31 acts as a lock to lock nut 36 against rotation. There is enough tension in the levers or springs to take up any expansion caused by heating and also to take up any variation caused by the expansion or contraction of the ring without the necessity of adjusting the bolt. This constitutes a very essential improvement over other clutches wherein it is necessary to provide accurate adjustment and in which slipping will occur after the clutch has warmed up.

Lugs 17 and 18 hold the expansible friction ring 19 in position without the use of bolts or pins, thus eliminating all projections from the clutch.

A clutch of my improved construction is simple and very effective in operation, has no projecting parts or bolts of any kind to hold the friction ring in place which might endanger the lives of workmen, can be easily and quickly adjusted, and will automatically adjust itself to any minor variations.

What I claim is:

1. The combination of a driven clutch member provided with a circumferentially disposed friction rim, a driving clutch member, a split friction ring carried by said driving clutch member and adapted to operatively engage the rim of said driven member, a radially slidable member mounted on said driving member and operatively engaging one end of said split ring and resilient operative connections between the opposite end of said split ring and said actuating member.

2. A clutch comprising a driven member, a driving member, an expansible split friction ring for operatively interengaging said members, a pair of cooperating leaf spring members one of which is in engagement with one end of said ring, and a displaceable wedge member engaging the opposite end of said ring and the other of said spring members for expanding said friction ring.

3. A clutch comprising a driven clutch member provided with an annular flange, a driving clutch member, a split expansible ring carried by said driving member and adapted to frictionally engage the annular flange of said driven member, a slidable member having operative engagement with one end of said ring, resilient means engaging the opposite end of said ring and operable by said slidable member whereby when said slidable member is actuated said ring is caused to engage the annular flange of the driven member, and adjustable means for regulating the resiliency of said resilient means.

4. A clutch comprising a driven clutch member having a circular rim, a driving clutch member, a split expansible ring arranged on the driving clutch member and adapted to frictionally engage the inner wall of said rim, a slidable member arranged on said driving clutch member and having its outer end operatively engaging one end of said ring, resilient means carried by said driving clutch member and operatively connecting the outer end of said slidable member with the opposite end of said ring, and means for moving said slidable member into an outer or protracted position whereby said ring is expanded and interengages said clutch members.

5. A clutch comprising a driven member provided with a circular rim, a driving clutch member, a split expansible ring adapted when expanded to operatively interengage said clutch members, a pair of oppositely disposed yielding levers, the outer end of one of said levers having operative engagement with one end of said ring, adjustable means for regulating said levers, and means engaging the outer end of the other lever and the corresponding opposite end of said ring and adapted when actuated to cause said ring to move into an expanded operative position.

6. A clutch comprising a pair of cooperating members, an expansible member carried by one of said clutch members and adapted when expanded to frictionally interengage said clutch members, a bar slidably mounted on one of said clutch members and provided on the outer end with a pair of cam faces one of which is in engagement with said expansible member, and a pair of resilient levers having their outer ends in operative engagement with said expansible member and the other one of said cam faces of said slidable member, whereby when said slidable member is actuated, said expansible member is forced into an operative position.

7. A clutch comprising a pair of cooperating clutch members, an expansible member carried by one of said clutch members and adapted when expanded to frictionally interengage said clutch members, a bar slidably mounted on one of said clutch members, and provided on its outer end with a pair of cam faces one of which is in engagement with said expansible member, a pair of resilient levers having their outer ends in operative engagement with said expansible member and with the other of said cam faces of said slidable member, whereby when said slidable member is actuated, said expansible member is forced into an operative position, and means engaging the inner portions of said levers for adjusting the tension thereof, the inner end of one of said levers being lengthened and adapted to be placed under tension thereby locking said adjusting means.

In testimony whereof I hereunto affix my signature this 4th day of April, 1922.

THEODORE F. PHILIPPI.